US000001118H

United States Statutory Invention Registration [19]

[11] Reg. Number: H1118

[43] Published: Dec. 1, 1992

Quigley

[54] CHEMICAL COMMINUTION AND DEASHING OF LOW-RANK COALS

[75] Inventor: David R. Quigley, Idaho Falls, Id.

[73] Assignee: The United States of America as represented by the United States Department of Energy, Washington, D.C.

[21] Appl. No.: 412,716

[22] Filed: Sep. 26, 1989

[51] Int. Cl.[5] ..... C10L 9/00

[52] U.S. Cl. ..... 44.620; 44/624; 44/626

[58] Field of Search ..... 44/620, 624, 626

[56] References Cited

U.S. PATENT DOCUMENTS

| | | | |
|---|---|---|---|
| 3,993,455 | 11/1976 | Reggel et al. | 423/461 |
| 4,080,176 | 3/1988 | Verschuur | 44/24 |
| 4,200,439 | 4/1980 | Lang | 44/620 |
| 4,204,843 | 5/1980 | Neavel | 44/620 |
| 4,234,319 | 11/1980 | Beeson | 44/620 |
| 4,305,728 | 12/1981 | Schulz | 44/620 |
| 4,313,737 | 2/1982 | Massey et al. | 44/51 |
| 4,468,231 | 8/1984 | Bartok et al. | 44/604 |
| 4,775,387 | 10/1988 | Narain et al. | 44/624 |

OTHER PUBLICATIONS

Pang et al., "Hydrogen Evolution During Alkali Digestion of Brown Coal".

Olson et al., "Hydrosols from Low-Rank Coals: 1. Preparation and Properties and 2. Low Temperature Oxidation".

Quigley et al., "Factors Affecting the Solubilization of Low Rank Coals by Microorganisms", American Chemical Society, Sep. 1988.

Quigley et al., "Comparison of Products Obtained by Alkali and Microbial Solubilization of Coal", (1987).

Quigley et al., "The Influence of pH on Biological Solubilization of Oxidized, Low-Rank Coal", (1988).

Quigley, "Factors Effecting Microbial Coal Solubilization", *Biotech in Minerals and Metal Processing,* (1989).

Quigley et al., "Evidence that Microbially Produced Alkaline Materials are Involved in Coal Biosolubilization", *Applied Biochemistry and Biotechnology,* vol. 20/21, 1989.

*Primary Examiner*—Donald P. Walsh
*Assistant Examiner*—Daniel Jenkins
*Attorney, Agent, or Firm*—Hugh W. Glenn; Robert J. Fisher; William R. Moser

[57] ABSTRACT

A method of chemically comminuting a low-rank coal while at the same time increasing the heating value of the coal. A strong alkali solution is added to a low-rank coal to solubilize the carbonaceous portion of the coal, leaving behind the noncarbonaceous mineral matter portion. The solubilized coal is precipitated from solution by a multivalent cation, preferably calcium.

12 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CHEMICAL COMMINUTION AND DEASHING OF LOW-RANK COALS

CONTRACTUAL ORIGIN OF THE INVENTION

The U.S. Government has rights in this invention pursuant to Contract No. DE-AC07-78ID01570 between the United States Department of Energy and EG&G Idaho, Inc.

BACKGROUND OF THE INVENTION

This invention relates to methods for chemically comminuting and increasing the heating value of low-rank coals. As utilized herein, the term "low-rank coals"are those coals having high oxygen and mineral matter contents, at least 15% in each case. Mineral matter in low-rank coals generally occurs in the range of 10–40% (by weight) and can comprise a variety of non-combustible inorganic constituents. Such mineral matter (also known as "ash") occurs as kaolinite and other clay minerals, quartz and gypsum. Sulfur occurs primarily as pyrite (FeS,), comprising about 40–80% of the total sulfur, and about 1–10% of the total coal.

Low-rank coals are relatively little used despite their relative abundance. Such coals have low heating value, high moisture content and high mineral matter content. Such coals are relatively common in Texas, Montana and North Dakota in large quantities, reasonably near the surface. Because of their abundance and accessibility, numerous attempts have been made to convert such coals into more environmentally-sensitive forms for use. For example, U.S. Pat. Nos. 4,313,737 and 4,421,722, both to Massey et al involve the pretreatment of coals by explosive comminution. Such process is intended to remove pyritic sulfur and other mineral inclusions from comminuted coal. In U.S. Pat. Nos. 4,775,387, Narain et al, a coal slurry in an aqueous alkali solution is heated under pressure to above the critical conditions of steam. Explosive release of the pressure fractures the coal into 10–30 micron particle size.

In U.S. Pat. No. 3,993,455, Reggel et al, pyritic sulfur and mineral matter is removed from coal by treating the coal with aqueous alkali at elevated temperatures followed by acidification with a dilute strong acid. Temperatures of from about 175–350° C. and 6N sulfuric acid is preferred.

It has also been proposed that low-rank coals be biosolubilized in order to increase the heating value of coals prior to burning. Apparently, microbial coal solubilization results from production of alkali materials in situ, and can be enhanced with an oxidative pretreatment of the coal with various acids.

Low-rank coals generally have structures containing much more oxygen than do more commercially valuable, higher rank coals. Such oxygen is typically present as carboxylic acids, alcohols and ethers. To whatever extent a coal sample is soluble, usually in alkali solutions, the solubility is dependent upon the coal oxygen content—the greater the oxygen content, the greater the potential solubility. Solubilized coal has the added benefit of having less than 1% mineral matter (ash) associated with it, thereby removing as much as, if not more than 50% of the sulfur originally present in the coal. Therefore, it is an object of the present invention to provide a process whereby low-rank coals having high mineral matter (including sulfur) and oxygen contents can be solubilized, providing a finely ground comminuted coal having a reduced sulfur content.

Sulfur in coal is a major constituent of sulfur oxide ($SO_x$) emissions which ultimately contribute to acid rain therefore, much effort is expended to remove sulfur from coal prior to burning. One process for separating mineral matter from coal, or desulfurizing coal, is to solubilize the coal using dilute alkaline solution, remove the mineral matter by centrifugation, and precipitate the solubilized coal with excess amounts of acid (see Olson at al, Fuel 67:1053 (1988)). While such process may be effective, it is not commercially practicable on the large quantities of coals burned for electric power generation.

SUMMARY OF THE INVENTION

In its broad aspects the present invention in one embodiment is a process whereby a strong alkali is added to a low-rank coal, thereby solubilizing the carbonaceous portion of the coal, and a multivalent cation is thereafter added to the solubilized coal solution in order to precipitate the coal from solution.

In a preferred embodiment, a coal having at least 10% oxygen is solubilized in a 100 mM solution of NaOH and thereafter precipitated with a calcium solution having a final concentration of at least 10 mM.

The process of this invention is preferably utilized on low-rank coals having at least 10%, and preferably at least 20%, oxygen, and mineral matter content of at least 10%. The process will recover at least 85%, and preferably over 95%, of the soluble carbonaceous material present in the coal. While addition of $Ca^{+2}$ ions results in the highest recovery of solubilized coal, other multivalent cations, such as $Fe^{+2}$, $Fe^{+3}$, $Al^{+3}$ or $Mg^{+2}$ may be utilized.

DETAILED DESCRIPTION OF THE INVENTION

Figure 1:
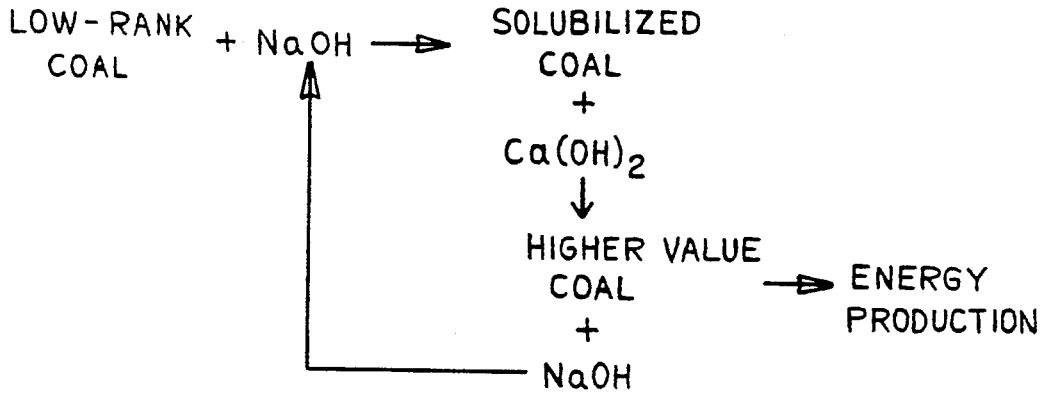
FIG. 1 schematically illustrates the process of the present invention.

One embodiment of carrying out the present invention is illustrated in the flow diagram of FIG. 1. A low-rank coal, such as one of the coals set forth in Table 1 below, is mixed with an alkaline solution. It is to be understood that the low-rank coals utilized herein are typically those having a constituent analysis which makes them unsuitable (or at least not preferred) for utilization in conventional power plants due to their low heating Value and high sulfur content. As set forth in Table 1, such coals typically have oxygen contents of at least 10%, and quite often greater than 20%. The sulfur content may be as high as 3% or more and the ash content from below 10% to almost 40%. The high mineral matter content is the critical attribute in the low heating value of such coals, while the relatively high sulfur content is the cause of $SO_x$ emissions when burned ultimately resulting in acid rain.

Applicant has found that economically important low-rank coals can be almost quantitatively solubilized in appropriate alkaline solutions. Coal in solution has less than 1% ash associated with it, and removal of virtually all of the ash results in an approximate 50% reduction in the sulfur content of the coal. Applicant has determined that solubilized coal can be precipitated from solution by the addition of certain multivalent cations. It is believed that the solubility of a particular coal is greatest when it contains at least 20% oxygen, and precipitation is most effective when utilizing calcium at a concentration greater than 10 mM.

The process of the present invention is most easily understood with reference to the following example.

EXAMPLE

Various coal samples were obtained and stored under a nitrogen atmosphere throughout this experiment. Coal solubilization was accomplished by placing 5 g of coal in various concentrations of NaOH for approximately 24 hours. Coal samples in one liter of NaOH were sealed in flasks and shaken on a rotary shaker at 180 rpm for 24 hours. The resulting suspension was centrifuged at 1,300 xg for 10 minutes. Precipitants were washed with water and lyophilized. Soluble coal was filtered through a 0.2 μm filter and precipitated by the addition of hydrochloric acid until the pH of the suspension was less than 2.0. Coal was allowed to precipitate for several hours before being collected by centrifugation. Solubilized coal was washed with 1 mM HCl and lyophilized. Because the low-rank coals used in this example comprise at least 15–20% mineral matter, Applicants performed the acid precipitation in order to give an insoluble product having no exogenous mineral matter therein. Because solubilization removes the soluble carbonaceous portion from the insoluble mineral matter (ash) portion, the acid precipitation permits the determination of the amount of endogenous mineral matter that was removed. For example, if one assumes removal of virtually all the mineral matter by acid precipitation, the measured amount can be compared with the amount removed by the inventive process. Assuming that about 15–20% of the multivalent cations remain in the coal after precipitation, any excess mineral matter not recovered remains in the coal sample.

Precipitation of solubilized coal by the process of the present invention is accomplished by adding a multivalent cation, preferably in the form of CaO, $Ca(OH)_2$ or limestone to coal solutions at 10 mM and allowed to stand for several hours. Samples were centrifuged to remove precipitated coal. Controls containing either NaCl or no additions were treated identically. Absorbencies of supernatants at 400 nm were determined. Measurement of solution absorbency is an easier and more simple method than measurement of total organic carbon solubilized. It was previously determined that at a wave length of 400 nm, the absorbance of coal solutions is linear with respect to total organic carbon. Calcium concentrations in supernatants were determined using an atomic absorption spectrophotometer.

Figure 2:
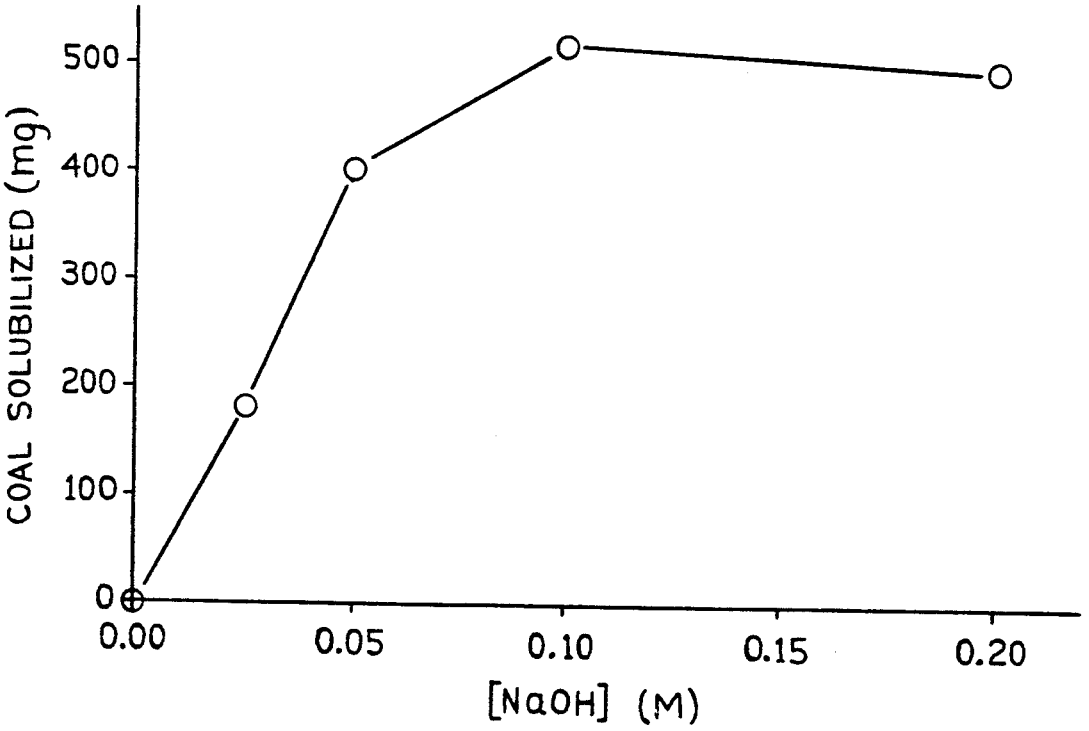
FIG. 2 illustrates the effect of NaOH concentration on low-rank coal solubilization.
Figure 3:
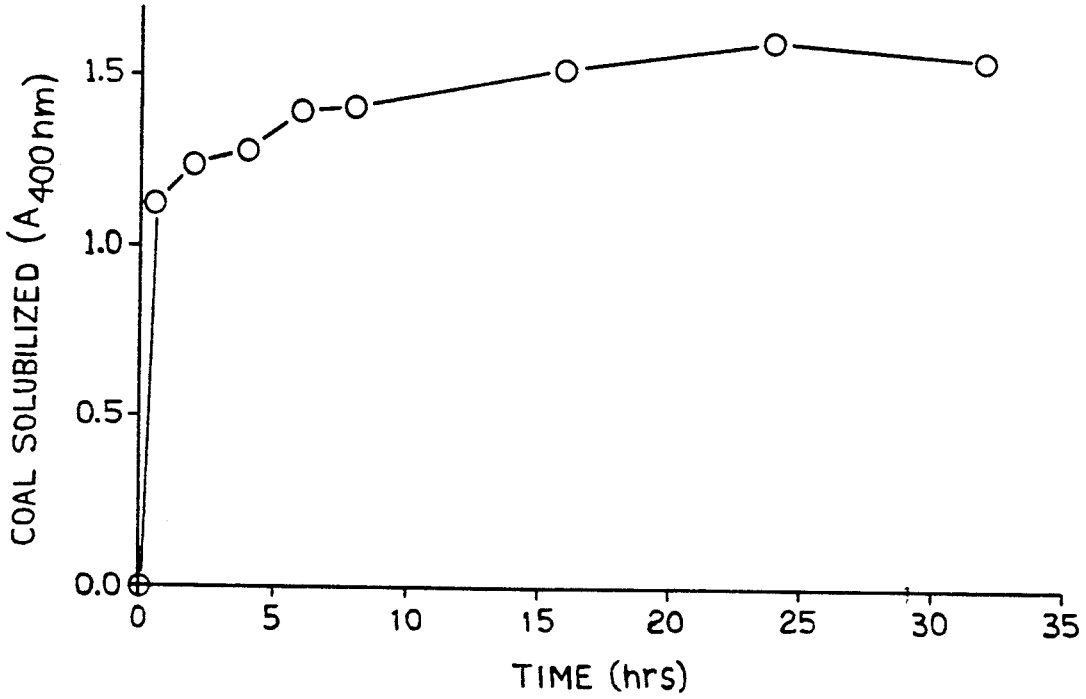
FIG. 3 illustrates the effect of time on the solubilization of low-rank coal.

RESULTS—As illustrated by FIG. 2, the optimal concentration for coal solubilization when utilizing NaOH is approximately 100 mM. It is to be understood that other strong bases, such as KOH, may be utilized in the process of this invention. When utilizing a NaOH concentration of 100 mM, coal solubilization occurs quite quickly (FIG. 3). As illustrated, the majority of coal that was eventually solubilized goes into solution within about the first 30 minutes. Coal continues to be solubilized at a much slower rate for approximately 24 hours, at which time maximum solubilization is obtained. As a result of these figures, solubilities of several coals that had oxygen contents between about 17% and 26% were determined (Table 1).

TABLE 1

| Coal | ANALYSES OF COAL | | | | | | |
|---|---|---|---|---|---|---|---|
| | C[a] | H | N | O | S | Ash | Moisture |
| Wyodak | 75.47 | 6.01 | 1.11 | 16.93 | 0.48 | 8.63 | 27.51 |
| Beulah Zap | 72.39 | 5.74 | 1.16 | 20.19 | 0.53 | 9.34 | 30.50 |
| Claiborne | 69.87 | 7.47 | 0.70 | 18.71 | 3.25 | 19.62 | 4.86 |
| Rosebud | 74.47 | 5.47 | 1.25 | 18.81 | 0.98 | 13.01 | 14.08 |
| PSOC-1430P | 71.83 | 5.12 | 1.09 | 20.34 | 1.63 | 14.95 | 11.90 |
| Wilcox | 65.45 | 4.67 | 1.37 | 25.92 | 2.59 | 10.39 | 10.74 |
| Yegua-Jackson | 70.45 | 7.32 | 1.25 | 19.27 | 1.71 | 39.77 | 29.41 |

[a]Values are given as DAF and are the averages of two determinations.

The coals of Table 1 were solubilized using 100 mM NaOH for 24 hours and separated into alkali soluble and insoluble fractions. Recovery of starting materials (using the acid precipitation set forth above as a baseline) ranged from about 86 to about 99% (Table 2).

TABLE 2

| Coal | SOLUBILITIES OF COALS IN ALKALINE SOLUTIONS | | | |
|---|---|---|---|---|
| | Soluble Carbon | Total Carbon | % Carbon Soluble | Recovery |
| Wyodak | 0.52 g | 3.09 g | 16.8 | 97.2% |
| Beulah Zap | 0.50 g | 2.93 g | 17.1 | 96.7% |
| Claiborne | 1.20 g | 3.27 g | 36.7 | 89.1% |
| Rosebud | 0.06 g | 3.61 g | 1.7 | 99.0% |
| PSOC-1430P | 0.61 g | 3.55 g | 17.2 | 97.0% |
| Wilcox | 2.70 g | 3.65 g | 74.0 | 93.1% |
| Yegua-Jackson | 0.76 g | 1.02 g | 74.5 | 85.5% |

The solubilization process fractionated the coal according to oxygen content (Table 3).

TABLE 3

| Coal | ANALYSES OF SOLUBILIZED COALS | | | | | |
|---|---|---|---|---|---|---|
| | C | H | N | O | S | Ash |
| Wyodak | 74.47 | 6.01 | 1.11 | 16.93 | 0.48 | 8.63 |
| Wyodak-Soluble | 68.73 | 4.49 | 1.25 | 25.08 | 0.45 | N.D. |
| Wyodak-Residue | 78.48 | 5.79 | 1.17 | 14.14 | 0.42 | 17.02 |
| Beulah Zap | 72.39 | 5.74 | 1.16 | 20.19 | 0.53 | 9.34 |
| Beulah Zap-Soluble | 68.97 | 4.43 | 1.26 | 24.87 | 0.53 | N.D. |
| Beulah Zap-Residue | 77.38 | 5.57 | 1.15 | 15.32 | 0.58 | 17.48 |

In the first extraction, soluble coal had an oxygen content of about 25% (significantly greater than that of the starting material). The residue remaining after solubilization had a much lower concentration of oxygen, indicating that the coal molecules containing large amounts of oxygen were solubilized while molecules containing lower amounts of oxygen were not initially solubilized. During the extraction of 5.0 g of Benla Zap coal in 1.0 l of 100 mM NaOH, residual coal containing lower amounts of oxygen was soluble at 10–15% the rate of the original coal.

| Extraction | Wt of Soluble Fraction |
|---|---|
| 1st | 462 mg |
| 2nd | 40 mg |
| 3rd | 41 mg |
| 4th | 55 mg |

The extractions were terminated after the fourth extraction; the weight of the insoluble portion was 2.763 g.

Figure 4:
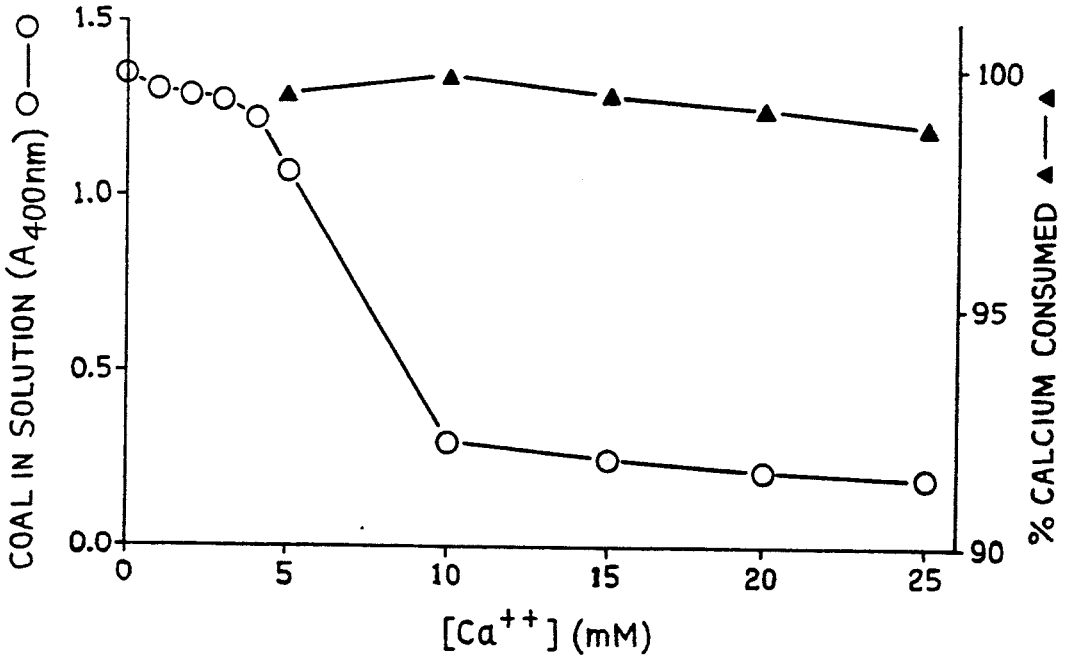
FIG. 4 illustrates the effect of calcium concentration on the solubility of low-rank coal.

The coals solubilized using 100 mM NaOH were readily precipitated from solution by the addition of multivalent cations. As illustrated in FIG. 4, calcium ion concentrations greater than about 10 mM precipitated approximately 85% of the soluble coal. Controls containing NaCl at similar ionic strengths did not result in precipitation of coal, indicating that this was not a "salting out" effect. As illustrated in FIG. 4, approximately 98% of the added calcium was removed from solution as the coal was precipitated, indicating that the coal and calcium were forming an insoluble complex.

It was determined that the precipitate formed upon addition of calcium to solubilized coal is a flocculate having a size of about −60 mesh. Therefore, upgraded low-rank coals resulting from this process do not need to be ground prior to burning.

It is readily apparent that the process of the present invention upgrades low-rank coals by reducing the ash content. There are apparently two forms of ash present in low-rank coals—mineral inclusions and cations bound to the organic coal matrix. Coal solubilization results in virtually complete removal of mineral matter present as inclusions, such as pyrite, clays and silicates. The unwanted mineral inclusions are removed and the ash that remains contains substantial amounts of calcium. The calcium present in the precipitated coal reduces the calcium carbonate required to effect the sequestering of sulfur (in the form of $SO_x$) during the typical burning process. The addition of calcium carbonate may be substantially reduced, or in some cases totally eliminated.

While the process of this invention has been described herein with reference to already-mined coal, it is Applicants' belief that this process will function to effect in situ mining of low-rank coals, resulting in upgrading the coals, desulfurizing the coals, and comminuting the coals. The result is a coal of increased heating value, lower sulfur content, and of a size not requiring comminution prior to use. Additionally, while the example above illustrated the use of NaOH and $Ca^{+2}$ ions in the solubilization and precipitation of coals, it is to be understood that these are illustrative only. As coal oxygen content decreases, the need for higher pH solubilization agent increases; conversely as the coal oxygen content increases the solubilization pH may be dramatically decreased. For example, a coal having 30–35% oxygen (Leonardite coal from North Dakota) may be solubilized in solutions having a pH as low as 5.5, assuming that pH 5.5 is maintained throughout the solublization process. Such coal solubilized in a pH 8.0 solution can be completely precipitated in a 3 mM $Ca^{+2}$ solution. With a lower oxygen concentration, although still relatively high, of 15–25%, 10 mM appears to be optimal concentration.

Metal ions are present in the coal matrix as salts of carboxylic acids, alcohols and phenols. While the removal of these metal ions has been shown to increase coal solubilities in alkaline solvents at elevated temperature, prior to the present invention coal solubilized by the removal of metal ions (such as $Fe^{+2}$, $Ca^{+2}$ and $Al^{+3}$) was not recoverable without substantially increasing the temperature of or pretreating the solubilized coal with an acid. Removal of multivalent cations ionically bound to the carbonaceous coal matrix significantly enhances the solubility of the coal when solubilized in alkaline solutions. The decreased alkali solubility when multivalent cations are bound to the coal matrix may be due either to the nature of the cation-carboxylic acid bond or to cross-linking that forms large insoluble molecules from numerous small ones.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

We claim:

1. A method of comminuting, reducing a mineral content, and increasing the heating value of low rank coals for burning, said coals having a portion of non-carbonaceous and mineral matter inclusions therein, comprising:

a. subjecting a low-rank coal containing at least 10% oxygen to an alkaline solution in order to solubilize a carbonaceous portion of the coal and removing a solubilized carbonaceous portion therefrom;

b. subjecting the removed solubilized carbonaceous portion to a multivalent cation solution selected from the group consisting of $Ca^{+2}$, $Fe^{+2}$, $Fe^{+3}$, $Al^{-3}$, and $Mg^{+2}$ at a concentration of at least 3 mM, to precipitate the carbonaceous portion of the coal from the alkaline solution to produce a flocculate; and c. removing the precipitated carboraceous portion, at least partially drying the precipitated carbonaceous portion and thereafter burning the carbonaceous portion.

2. The method as recited in claim 1 and wherein a sodium hydroxide solution is utilized as the alkaline solution.

3. The method as recited in claim 2 and wherein said sodium hydroxide solution has a concentration of about 100 mM.

4. The method as recited in claim 1 and wherein said multivalent cation solution includes calcium as the multivalent cation.

5. The method as recited in claim 1, further comprising recycling the alkaline solution to a new quantity of coal after the carbonaceous portion has been precipitated from the solution.

6. The method as recited in claim 1 and wherein the coals are subjected to an alkaline solution in situ.

7. A method of comminuting and preparing low-rank coals for burning by reducing a mineral content of said coals, said coals having a portion of carbonaceous and mineral matter therein, comprising:

a. solubilizing the carbonaceous material of said coals containing at least about 10% oxygen in a solution of sodium hydroxide having a pH of at least 10.0 and removing a solubilized carboneaous portion therefrom;

b. precipitating the carbonaceous material from said solution to produce a flocculate by introducing a solution containing calcium ions having a final concentration in solution of at least 10.0 mM; and c. removing, drying and burning the precipitating carbonaceous portion.

8. The method as recited in claim 7, further comprising recycling the alkaline solution to a new quantity of coal after the carbonaceous portion has been precipitated from the solution.

9. The method as recited in claim 7 and wherein the coals are subjected to an alkaline solution in situ.

10. A method of increasing the heating value and reducing the mineral content of a low-rank coal having a carbonaceous portion and a mineral matter portion, comprising the steps of:

a. solubilizing the carbonaceous portion of a low-rank coal containing at least 10% oxygen in aqueous solution of sodium hydroxide having a concentration of about 100 mM to separate the carboneous portion from the mineral matter portion and removing the solubilized carbonaceous portion therefrom;

b. precipitating the solubilized carbonaceous portion from the aqueous solution by adding a calcium-containing solution thereto, to produce a flocculate having a size of about—60 mesh with the final concentration of calcium in the mixture being at least 10.0 mM;

c. removing, drying, and burning the precipitating carbonaceous portion; and d. recovering and recycling the aqueous solution.

11. The method as recited in claim 10 and wherein the coals are subjected to an alkaline solution in situ.

12. The method as recited in claim 10, wherein said method is performed on a quantity of coal which has been extracted from an underground site.

* * * * *